3,183,719
TEMPERATURE SENSING DEVICE
Robert J. Norman, Chicago, and Ernest J. Duchek, Evanston, Ill., assignors to The Powers Regulator Company, Skokie, Ill., a corporation of Illinois
Filed June 22, 1962, Ser. No. 204,357
15 Claims. (Cl. 73—362.4)

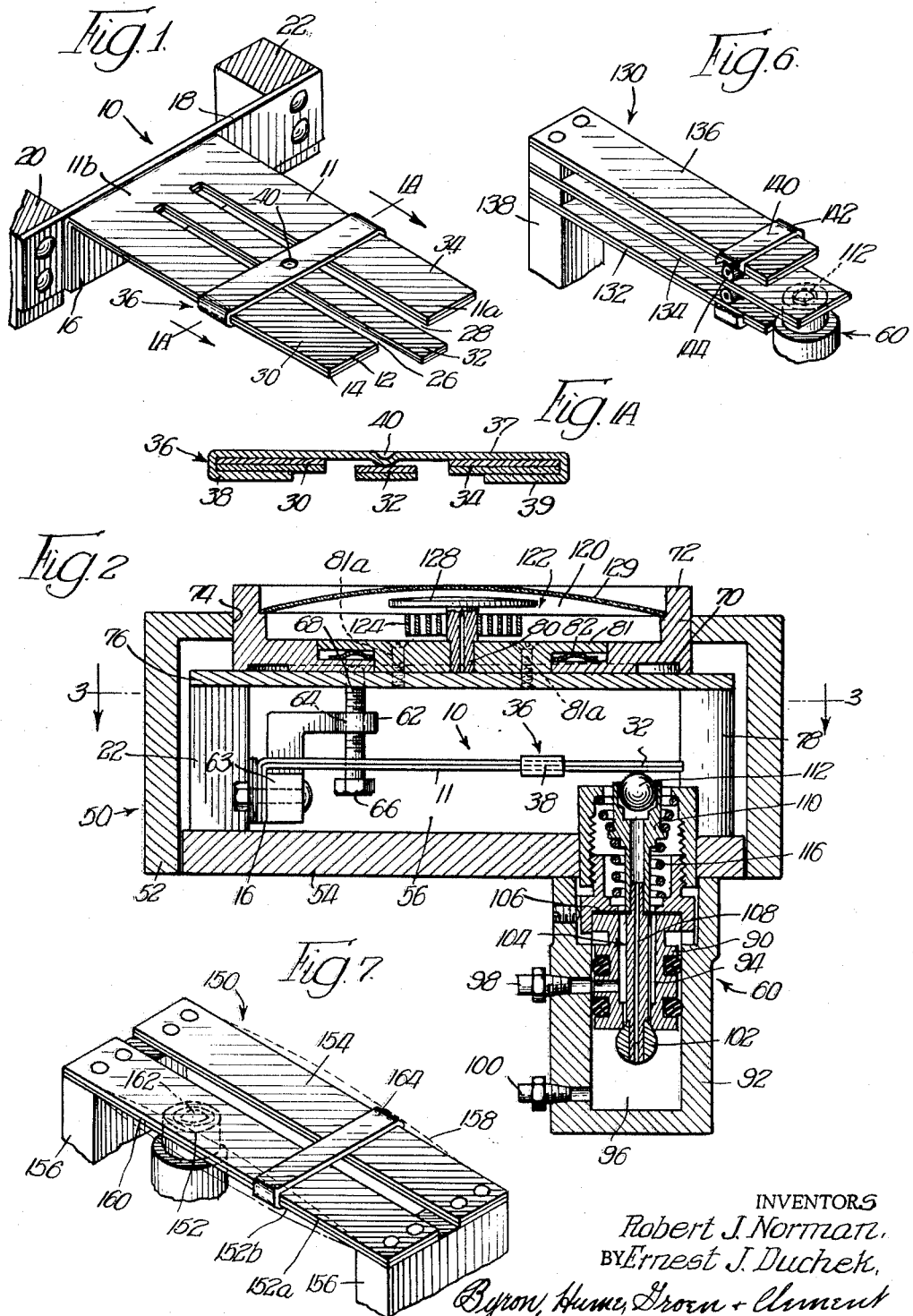

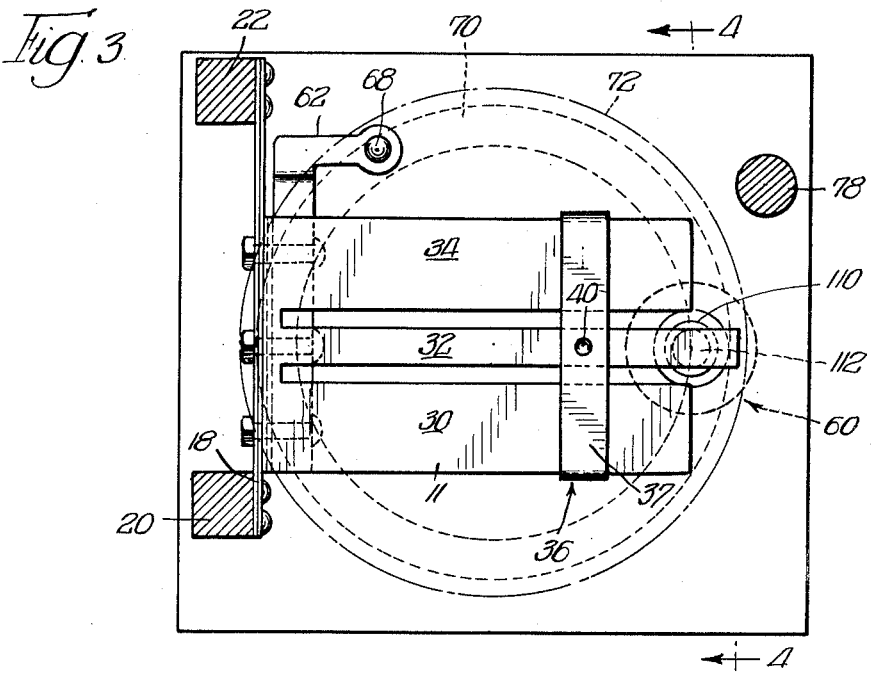
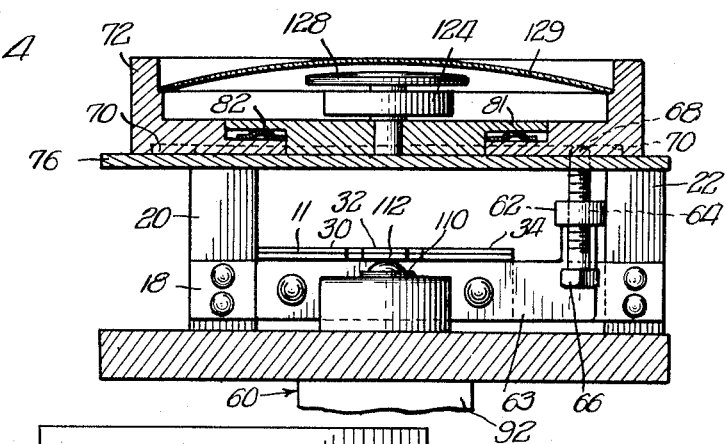
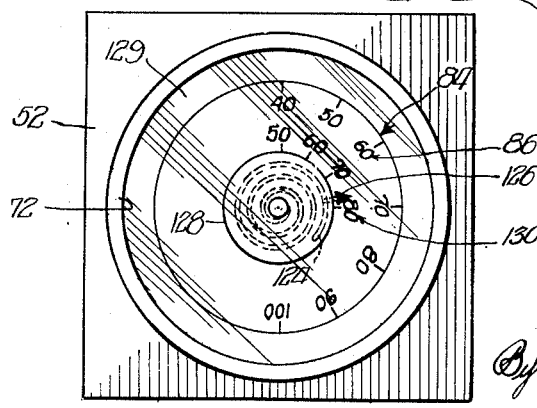

This invention pertains to a temperature sensing device and, in particular, to a device which utilize a temperature sensitive bimetallic element.

Bi-metallic elements are commonly used for sensing temperature and in particular for controlling the temperature of a selected medium. One example of such use is an air conditioning system where the bimetallic element senses the temperature of the air to be treated by the air conditioner. The bimetallic element cooperates with a pneumatic relay which in turn generates a pneumatic signal corresponding with the signal received from the element. The pneumatic signal in turn controls the flow of heating or cooling fluid into the heat exchanger of the air conditioner.

Generally, the signal emitted by the relay is transmitted to the bimetallic element as well as the control device. The signal as transmitted to the bimetallic element is known as feed-back, and indicates to the bimetallic element that a change has been made in the system corresponding to the variation in temperature. One of the problems encountered in such systems is correlating the force generated by the bimetallic element for each unit of movement and in turn each unit of temperature variation, with the characteristics of the relay and the pneumatic system. Obviously, the force generated by the bimetallic element must be of sufficient magnitude to actuate the relay. Furthermore, the force must be of sufficient magnitude to maintain the relay in its open position until a signal of predetermined magnitude has been generated thereby. If the force is too small, the signal generated by the relay, and in turn sensed as feed-back, will close the system prematurely. As a result the change in the system will be insufficient to correct the variations sensed by the bimetal. On the other hand, if the force is too great the relay may be biased open for too long a period whereby the change is more than necessary to correct the variations sensed by the bimetallic element. The former condition leads to a large deviation from a set point whereas the latter condition may cause instability which leads to hunting.

The subject invention provides a means by which the force of the bimetallic element may be readily varied, in order to properly adjust it to correspond with the characteristics of the system in which it is used. Briefly, the invention may be described as a plurality of bimetallic blades arranged in a closely spaced substantially parallel relationship. The blades are fixed or mounted at, at least, one of their common ends with one of the blades being in driving relationship with the relay. A means for providing a force interlock for the blades is slidable along their longitudinal lengths toward and away from the fixed end. As will be seen hereinafter, the entire length of the blade which is in driving relationship with the relay will be exerting force thereon as a result of any variation in temperature. However, only that portion of the other of the blades between the locking means and the fixed ends will exert any driving force on the relay. By varying the distance of the locking means from the fixed ends it is possible to vary the force exerted by the blades on the relay.

One of the foremost features and objects of the invention resides in the provision of a temperature sensitive bimetallic element in which the force generated by a unit change in temperature may be selectively varied.

Another object of the invention resides in the provision of a bimetallic element that is especially suited for use and controlling the temperature of a selected medium.

Another object of the invention resides in the provision of a bimetallic element that is especially suited for use in conjunction with force balanced relays particularly of the pneumatic type.

Another object of the invention resides in the provision of a bimetallic element which, when used in conjunction with forced balanced relays, has a selectively variable sensitivity.

A still further object of the invention resides in the provision of a bimetallic temperature sensing device in which the force generated by a unit change in temperature may be selectively adjusted to that necessary to return the system in which it is used to the desired temperature level.

The above features and objects will be readily apparent upon reading of the specification with reference to the following drawings.

In the drawings:

FIGURE 1 is a perspective view of one embodiment of the bimetallic element constructed in accordance with the invention.

FIGURE 1A is a sectional view taken along lines 1A—1A in FIGURE 1.

FIGURE 2 is a thermostatic control unit including the bimetallic element shown in FIGURE 1.

FIGURE 3 is a sectional view taken along the lines 3—3 in FIGURE 2.

FIGURE 4 is a sectional view taken along the lines 4—4 in FIGURE 3.

FIGURE 5 is a front view in elevation of the thermostatic unit.

FIGURE 6 is a perspective view of a modification of the invention.

FIGURE 7 is a perspective view of another modification of the invention.

Referring now to FIGURE 1 there is shown a perspective view of one form of the bimetallic element embodying the invention. It will be apparent that the bimetallic element may be constructed in any suitable fashion and of any suitable materials that will permit it to function in the manner intended. Furthermore, it is to be understood that, while the invention as described is used in conjunction with a pneumatic relay, such is merely by way of example. The thermostatic device embodying the invention may be utilized in any type of system or environment where its characteristics and the results provided thereby are of utility.

As shown in FIGURE 1 the bimetallic sensing device embodying the invention is generally denoted by the numeral 10. The sensing device 10 comprises the element 11 constructed of the laminations 12 and 14 which are fabricated from materials having different coefficients of expansion. For purposes of the describing the invention and the manner in which it operates it will be assumed that the lamination 12 has a higher coefficient of expansion than the lamination 14. Thus, when the bimetallic element senses an increase in temperature, the free end 11b thereof will tend to bow downwardly in order to accommodate the greater expansion of the lamination 14 relative to lamination 12. Conversely, when the element senses a decrease in temperature the free end 11b will bow upwardly in order to accommodate the differences between the laminations 12 and 14.

In the construction shown in FIGURE 1, one means by which the bimetallic element 11 may be mounted is shown. It will be understood that this is merely by way of example and any suitable mounting arrangement may be used. This specific arrangement discloses a downwardly turned flange 16 which is secured by rivets or any other means to a cross member 18. The cross member 18 is in turn adapted to be supported by the posts 20 and 22 mounted at each end. The cross member 18 and posts 20 and 22 serve to fix the end 11a of the bimetallic element 11 and to support it in cantilever fashion.

The bimetallic element 11 is provided in this particular embodiment with the two slots 26 and 28 which extend longitudinally thereof from the free end 11b to adjacent the fixed end 11a. The slots 26 and 28 divide the bimetallic blade into the sections 30, 32 and 34. As will be seen, the three sections may be formed from three separate blades which are arranged in a closely spaced relationship and will function in substantially the same manner as the single slotted element.

A locking member 36 bridges the sections 30, 32 and 34 and serves to lock those portions extending between the locking member 36 and the fixed end 11a together.

As seen in FIGURE 1A, the locking member 36 comprises a strap 37 which is folded over at the ends to form the channel sections 38 and 39. The channel sections 38 and 39 embrace sections 30 and 34 and serve to lock them to the center section 32. The locking member 36 is provided with a lug 40 which insures engagement with the intermediate section 32 whereby the force from the sections 30 and 34 are transmitted thereto in the downward direction only. As will be seen later on a decrease in temperature will result in a lessening of the force normally transmitted through the locking member.

The locking member 36 is slidable along the length of the bimetallic element 11 so that it may be selectively positioned at any distance from the fixed end 11a up to the free end 11b. As stated previously, the force exerted by the sections 30 and 34 is imposed upon the locking member 36 and in turn the center section 32. If we assume that the center section 32 of the bimetallic element 11 engages the relay or signal receiving device then the force exerted thereon is generated by the entire center section 32 and those portions of the sections 30 and 34 intermediate the locking element 36 and the fixed end. As the locking element 36 is slid toward the free end 11b the amount of force is commensurately greater. Thus by selectively positioning the locking element 36 it is possible to adjust the force generated by the bimetallic element 11 to some desired magnitude.

It is believed that the unique characteristics of the invention are the result of several factors which will be briefly described hereafter. It is well known that the force generated by a bimetallic blade for a unit change in temperature is inversely proportional to its length. Thus, as the locking element 36 is slid toward the fixed end the force exerted thereon by the sections 30 and 34 is increased since such sections have been, in effect, shortened. It is also true that a force applied to a cantilever beam produces a resultant force at the free end that is an inverse function of the distance between the force and the resultant thereof. Thus, as the locking element 36 is slid toward the free end a force applied thereby on the section 32 will produce a resultant of increasing magnitude. Another factor which is believed to be of significance in the operation of the invention is that the locking member serves to stiffen the section 32. Thus, as the locking member is moved toward the free end a greater percentage of the force imposed thereon is transmitted to the relay rather than being absorbed in the section 32 as deflection.

Thus, it would appear that the effects of the increasing resultant and the stiffening of the section 32 outweigh the decreasing force generated by the sections 30 and 34 as the locking member is slid toward the free end so that the resultant force at the free end increases. For the same reasons the resultant force decreases as the locking member 36 is slid toward the fixed end notwithstanding the increase in force generated by the sections 30 and 34. It is recognized that there may be other factors which may affect the operation of the invention.

To provide a clearer understanding of the bimetallic element embodying the invention it will now be described as utilized in a thermostatic control device, as shown in FIGURE 2. The control device is generally denoted by the numeral 50 and includes a casing 52 and a mounting base 54 which define a compartment 56 in which the bimetallic unit 10 is mounted. As stated previously the bimetallic element 10 comprises a blade 11 which is secured at one end to the posts 20 and 22 and which projects outwardly therefrom as shown in the drawing. The bimetallic blade 11 engages at one end the relay assembly generally denoted by the numeral 60 and which will be described later on. In the preferred embodiment the center section 32 engages the relay assembly 60 for the purpose of driving the same. However, it is apparent that the other sections may be equally well used for driving the relay.

As can be seen in FIGURE 3, a cross bar 18 extends between the posts 20 and 22 in the manner previously described. In the preferred embodiment the cross bar 18 comprises a torsion spring which may be twisted about its axes to a limited extent without permanent deformation. A lever member 62 projects outwardly from the cross member 18 and is substantially parallel with the bimetallic blade 11. The lever 62 is provided with a right angle section 63 which is secured at one end to the cross bar 18. The lever 62 includes an aperture 64 through which extends the threaded member 66. The threaded member 66 is provided with a ball end 68 which comprises a cam follower and is adapted to ride in the cam slot 70 of the temperature adjusting ring 72.

The temperature adjusting ring 72 is rotatably mounted within the aperture 74 extending through the casing 52. The ring 72 is supported by the plate 76 which is mounted on the posts 20, 22 and 78 extending upwardly from the base member 54. The ring 72 is secured to the plate 76 by the disc 81 which is affixed to the latter by the screws 81a. A spring washer 82 is disposed between the overlapping surface of the disc 81 and ring 72 for providing a frictional engagement therebetween which prevents inadvertent rotation of the latter.

The cam slot 70 varies in depth as can be seen in FIGURE 2. By way of example, in the section on the right hand the slot 70 is much deeper than on the left. As the ring 72 is rotated so that the cam slot 70 is varied the cam follower 68 and in turn the lever 64 are forced to accommodate such variations in height. For example, on those portions of the slot 70 which are relatively shallow, the lever 64 is forced downwardly. On the other hand, where the slot 70 is relatively deep the cam follower and in turn the lever 64 are forced upwardly. The movements of the lever 64 are imparted to the torsion spring 18 and in turn the bimetallic blade 11 whereby it is biased into engagement with the relay 60. The torsion spring 18 and the bimetal blade as a result of their own natural resilience force the cam follower into engagement with the bottom of the slot 70 so that the former follows the latter.

The deflection of the blade by the cam slot 70 serves to establish an equilibrium temperature and control pressure in the system. In the system shown and described hereafter, when the blade is deflected downwardly it serves to establish a lower equilibrium temperature than when the blade is in one of its upper positions. This, however, is dependent upon the nature of the relay used in conjunction with the bimetal and/or control valve actuated by the relay. Therefore, the assumption made as to the relationship of the positions to the equilibrium temperature is merely by way of example and not a limitation.

As can be seen in FIGURE 5 the ring 72 is provided with a suitable indicator arrow 84, which cooperates with indicia 86 mounted on the fixed disc 81. The indicia 86 are the various equilibrium temperatures that may be established in the temperature control assembly as correlated with the cam slot 70. By simply turning the ring 72 about the fixed disc 81 until the arrow 84 is brought into alignment with the appropriate temperature, a desired equilibrium temperature may be established in the system.

Referring now to FIGURE 2 a brief explanation will be made of the pneumatic relay 60 as shown therein. For a more complete description of the construction of the relay and the method of operation reference is made to the copending application of Robert J. Norman and Wesley L. Taylor, filed on July 11, 1962, assigned Serial No. 201,600, and assigned to the same assignee.

The pneumatic relay 60 comprises a valve body 90 which is mounted within a casing 92. The valve body 90, in essence, divides the casing into two compartments 94 and 96. The compartment 94 is connected to a source of supply pressure (not shown) by means of the port 98. The compartment 96 is connected by means of the port 100 to a suitable pressure actuated device such as a motor valve or the like (not shown), for controlling the supply of the heat exchange medium. The compartments 94 and 96 may be selectively connected by means of the ball valve 102, which in its closed position seats on the end of the valve body 90.

The ball valve 102 is connected to a stem assembly 104 which is connected to and extends through a diaphragm member 106. The stem assembly 104 is provided with the axial passage 108 which is open at one end to the control pressure compartment 96 and open at the other end to atmosphere. The other end of the stem assembly 104 has a housing 110 for receiving the ball valve member 112 which communicates with the end of the axial passage 108 for controlling the exhaust of the control pressure to atmosphere. The control pressure exerts a force on the ball valve 112, which constitutes a feed back force as will be seen hereafter. The relay assembly is provided with a suitable spring assembly 116 for biasing it toward its equilibrium position.

The ball valve member 112 is adapted to engage the bimetallic blade 11 to be driven thereby. As a result of the lever 62 and cam 70 the blade 11 biases the ball valve member 112 and the stem assembly 104 downward so as to tend to unseat the ball member 102. When the relay is at equilibrium the feed back force is equal and opposite to the biasing force so that ball members 102 and 112 are seated. When the bimetallic element senses an increase in temperature the downward force is increased whereby the ball valve member 112 and the entire stem assembly 104 are deflected downwardly. As a result the ball valve member 102 is unseated whereby the supply pressure is communicated into the control pressure compartment 96.

It will be assumed that an increase in control pressure will cause the motor valve (not shown) to close down or to throttle the flow of the heating medium into the heat exchanger (assuming that the air conditioning unit is being utilized for purposes of heating). As the control pressure increases such increase is communicated to the ball valve member 112 so as to cause a corresponding increase in the feedback force. Such increase in force is imposed upon the bimetallic blade 11 so as to tend to return it to its normal or equilibrium position. When the force exerted upon the ball valve member 112 equals the force generated by the bimetallic blade 11 the latter will be driven to its equilibrium position whereby the springs 116 will return the ball valve member 102 to its seated position. When this happens the supply pressure chamber will be shut off from the control pressure compartment 96, so that there is no further increase in the pressure in the latter.

If the bimetallic blade 11 should sense a decrease in temperature it will tend to deflect upwardly in view of our previous assumption. This in turn will reduce the biasing force on the ball valve 112 whereby the force exerted by the feedback pressure will be greater than that exerted by the blade 11. As a result, the ball valve 112 will be lifted off its seat so that the control pressure is vented to atmosphere. As the control pressure decreases the force exerted thereby on the ball valve 112 will likewise decrease until it equals that exerted by the blade 11. When this happens the blade 11 will force the ball valve 112 into its seated position so that there is no further venting of the control pressure to atmosphere.

As the control pressure increases, the motor valve (not shown) is closed so that the supply of heating fluid into the heat exchanger is decreased. The decrease will in turn cause a decrease in temperature or a correction of the temperature increase sensed by the blade 11. Conversely, as the control pressure decreases the motor valve (not shown) is permitted to open thereby increasing the flow of heating fluid into the heat exchanger of the air conditioning system. The increase in the heating fluid will ultimately cause the temperature to rise or in other words cause a correction of the decrease sensed by the blade 11.

It can now be seen that the problem arises as to how much of an increase in control pressure should be permitted before the system is shut off. For example, if the system is heating a relatively large volume of air it will require a much larger increase in control pressure to correct a given increase in temperature than if it is heating a smaller volume of air. Therefore, it is desirable that in the larger volume situation the motor valve (not shown) be throttled to a greater extent than for the same variation in temperature for the small volume system. This would mean that the bimetallic blade 11 upon sensing an increase in temperature should generate a greater downward force when used in the large volume system than when used in the small volume system. Thus the greater downward force will require a commensurately greater increase in control pressure before the relay is returned to its equilibrium condition. This greater increase in control pressure causes the control valve to throttle the heating medium to a greater degree. Conversely, a lesser increase in control pressure will cause throttling to a lesser degree. Therefore, when the system is used for heating a large volume system the locking member 36 is positioned so as to exert a relatively large force on the ball valve 112 for each unit change in temperature. On the other hand, when the system is used for heating a relatively small volume system, the locking element 36 is positioned toward the left so that a lesser force is exerted upon the ball valve 112 for each unit change in temperature.

The same considerations regarding the force are applicable when the bimetal senses a decrease in temperature. As will be recalled when the system is at equilibrium the bimetal imposes a biasing force on the relay. A decrease in temperature has the effect of reducing the stress in the bimetal which results in a decrease of the biasing force so that the force sensed by the relay is reduced. The magnitude of the decrease in the biasing force is dependent on the position of the locking member.

If the locking member 36 is positioned toward the fixed end the decrease in force will be relatively small and if positioned toward the free end the decrease in force will be relatively large. In either event, since the feedback force is greater than the force imposed by the blade 11 on the relay 60, the ball valve 112 will be unseated so that control pressure is exhausted to atmosphere. As the control pressure decreases the ball valve 112 will be biased toward its seat until it is finally seated. The decrease in pressure that is necessary before seating occurs will be dependent on the magnitude of the decrease in force. For example, if the locking member 36 is positioned toward the free end so that the decrease is relatively large whereby the force sensed by the relay 60 is relatively small, then a correspondingly large decrease in control pressure is required for seating. The large decrease in control pressure will in turn permit the control valve to approach fully open so that a proportionately large volume of heating medium is charged to the heat exchanger. On the other hand, if the locking member 36 is positioned toward the fixed end so that the decrease is relatively small whereby the relay 60 senses a relatively large force, then a small decrease in control pressure is required for seating. The small decrease will limit the opening of the control valve so that the increase in heating medium is relatively small.

It can now be seen that the bimetallic temperature sensing device can be tailored to the needs of the particular unit in which it is installed. This is particularly advantageous in air conditioning systems comprising a plurality of heat exchange units respectively positioned in a like plurality of rooms for controlling the temperature therein. The heat exchange units are connected to a central source of heat exchange medium and each include a thermostat for sensing the temperature of the associated room. If the room is relatively small in volume the locking member may be positioned toward the fixed end whereby the control valve regulating the flow of heat exchange medium into the heat exchanger has a relatively limited range. On the other hand, if the room is relatively large, the locking member 36 may be positioned toward the free end so that the control valve has a much wider range. In this manner the bimetallic device 10 may be constructed on a mass production basis without concern for the characteristics of a particular unit in which it is to be used. After it has been installed the element may then be appropriately adjusted by a positioning of the locking member for the characteristics of the associated room or area.

The bimetallic element 10 and relay 60 may be incorporated in a wall thermostat having an appearance that is aesthetically suitable for use in offices, homes and the like. In this particular instance the outer casing 52 and the rings 72 may be constructed of metal or plastic which meets the aesthetic requirements. The ring 72 defines a receptacle 120 in which is mounted the temperature indicating assembly 122. The temperature indicating assembly comprises a bimetallic spiral 124 which is anchored at one end to the post 80 with its free end being provided with an arrow or suitable pointer 126 as can be seen in FIGURE 5. The spiral 124 is covered by the circular plate 128 mounted on the post 80. The spiral 124 winds or unwinds as the temperature sensed by it varies. In this manner the free end and in turn the arrow 126 is positioned in accordance with the sensed temperature. The arrow 126 cooperates with suitable temperature indicia on the disc 81 for indicating the temperature sensed by the spiral. The temperature indicating assembly 122 is shielded by the transparent cover 129 which is mounted within the ring 72.

Referring now to FIGURE 6 there is shown a modification of the invention. In this modification the bimetallic temperature sensing device is generally denoted by the numeral 130 and is composed of three superimposed bimetallic blades 132, 134 and 136. The blades are arranged in a substantially parallel relationship with the blade 134 projecting at its free end substantially beyond the ends of the blades 132 and 136 and in driving relationship with the relay 60. The blades are supported and fixed at their common ends by the post member 138 and are interlocked together by the locking member 140. The locking member 140 includes the band 142 and a pair of roller members 144 which are disposed intermediate the blades 132, 134 and 136. The roller members are secured at their ends to the band 142 and serve to lock the blades together for transmitting the force from the blades 132 and 136 to the blade 134. The operation of the modification shown in FIGURE 6 is substantially the same as that previously described. Specifically, if the locking member is to move toward the free end the force exerted by the blade 134 for each unit change in temperature is increased.

In FIGURE 7 there is shown a still further modification of the invention in which the bimetallic element is fixed at both ends and is generally denoted by the numeral 150. The bimetallic element is composed of a pair of blades 152 and 154 which are arranged in a substantially parallel closely spaced relationship. The blades are fixed at their ends by means of the post members 156. The purpose of this arrangement is to provide a reverse acting characteristic to that shown in the modification in which the bimetallic blades are fixed at only one end. Of course this assumes that the relationship of the laminations are substantially the same in that the lamination 152a has a higher coefficient of expansion than the lamination 152b. In this construction when the bimetallic elements sense an increase in temperature they tend to bow upwardly as indicated by the dotted lines 158, and when they sense a decrease in temperature they tend to bow downwardly as indicated by the dot-dash line 160. The bimetallic element 152 is adapted to abut the relay or similar device at some point intermediate its ends as indicated by the numeral 162. The elements are interlocked by the locking member 164 which is slidably positioned intermediate the point 162 and the post member 156. As the locking member 164 is slid away from the post member 156, the force exerted by the blade 152 on the relay is increased for a given unit change in temperature. Thus, the operation of the bimetallic element is substantially the same as described previously except for the reverse acting characteristic.

It can now be seen that the subject invention provides a means by which the bimetallic element may be "tailored" for the characteristics of the system in which it is used. By selectively positioning the locking member it is possible to adjust the force generated by the bimetallic element for a unit change in temperature to that necessary to correct the same.

Although certain specific embodiments have been shown and described it is to be understood that these are merely by way of examples and in no manner to be considered as limitations. It will be apparent to those skilled in the art that certain modifications may be made within the scope of the claims appended hereto without departing from the scope of the invention.

What is claimed:

1. A temperature sensing device comprising a plurality of temperature sensitive bimetallic blades having first and second ends, said blades being arranged in a substantially parallel closely spaced relationship, means for interlocking said blades at selected distances from said first end.

2. The invention according to claim 1 in which said blades are arranged in substantially a single plane.

3. The invention according to claim 1 in which said blades are arranged in a superimposed relationship.

4. A temperature sensing device comprising a temperature sensitive blade having first and second ends, said blade having at least one slot extending from said first end toward said second end to form at least two sections, means for mounting said blade adjacent said second end, and means for interlocking said sections at selected distances from said second end, said means for interlocking being slidable intermediate said first end and said second end.

5. A temperature sensing device comprising a temperature sensitive blade having first and second ends, said blade having at least one slot extending from said first end toward said second end to form at least two sections, at least one of said sections being adapted to be placed in driving relationship with signal receiving means, means for mounting said blade adjacent said second end, and means for interlocking said sections at selected distances from said second end, said means for interlocking being slidable intermediate said first end and said second end.

6. A thermostatic control device comprising a temperature sensitive blade having first and second ends, said blade having at least one slot extending from said first end toward said second end to form at least two sections, means for mounting said blade adjacent said second end, means for interlocking said sections at selected distances from said second end, said means for interlocking being slidable between said first end and said second end, and a signal receiving means engaging one of said sections for receiving a signal from said blade in accordance with the temperature sensed thereby.

7. A temperature sensing device comprising a temperature sensitive blade having first and second ends, said blade having at least one slot extending from said first end toward said second end to form at least two sections, means for mounting said blade adjacent said second end, and means for interlocking said sections at selected distances from said second end, said means for interlocking being slidable between said first end and said second end, and a signal receiving means engaging one of said sections from receiving a signal from said blade in accordance with the temperature sensed thereby whereby said signal receiving means is driven by said one section and the portion of the other of said sections extending between said means for interlocking and said second end.

8. A thermostatic control device comprising a temperature sensitive blade having first and second ends, said blade having at least one slot extending from said first end toward said second end to form two sections, means for mounting said blade adjacent said second end, means for interlocking said sections at selected distances from said second end, said means for interlocking being slidable between said first end and said second end, a signal receiving means engaging one of said sections for receiving a signal therefrom in accordance with the temperature sensed thereby, and means biasing said blade to establish an equilibrium temperature in said signal receiving means.

9. A method for obtaining variable force signals from a temperature sensitive bimetallic device for a given change in temperature comprising the steps of placing a plurality of bimetallic blades in a closely spaced substantially parallel relationship, supporting said blades on at least one of their common ends, interlocking said blades at selected distances from said common ends, and placing one of said blades in driving association at the end other than said common end with a signal receiving means whereby said signal receiving means is driven by said one blade and those portions of the other of said blades extending through said selected distance.

10. A thermostatic control device comprising a bimetallic temperature sensitive element composed of a plurality of blade-like sections arranged in a closely spaced, substantially parallel relationship, means for mounting said bimetallic element at one end therof, means for interlocking said sections at selected distances from said one end, said means for interlocking being slidable along said blade-like sections, a signal receiving means engaging one of said sections for receiving a signal therefrom in accordance with the temperature sensed by said bimetallic element, a lever connected to said bimetallic element, and means for biasing said lever and in turn said bimetallic element to establish an equilibrium temperature by said signal receiving means.

11. A thermostatic control device comprising a bimetallic temperature sensitive element composed of a plurality of blade-like sections arranged in a closely spaced, substantially parallel relationship, means for mounting said bimetallic element at one end thereof, means for interlocking said sections at selected distances from said one end, said means for interlocking being slidable along said blade-like sections, a signal receiving means engaging one of said sections for receiving a signal therefrom in accordance with the temperature sensed by said bimetallic element, a lever connected to said bimetallic element, and cam means for selectively biasing said lever and in turn said bimetallic element to establish a selected equilibrium temperature by said signal receiving means.

12. A thermostatic control device comprising a bimetallic temperature sensitive element composed of a plurality of blade-like sections arranged in a closely spaced, substantially parallel relationship, means for mounting said bimetallic element at one end thereof, means for interlocking said sections at selected distances from said one end, said means for interlocking being slidable along said blade-like sections, a signal receiving means engaging one of said sections for receiving a signal therefrom in accordance with the temperature sensed by said bimetallic element, a lever connected to said bimetallic element, a cam means, cam follower means mounted on said lever engaging said cam means, said cam means being calibrated with various temperatures and being rotatable so as to selectively bias said lever and in turn said bimetallic element to establish a selected equilibrium temperature by said signal receiving means.

13. The invention according to claim 12 in which said cam means is defined as a rotatable disc having a slot of varying depth in which said cam follower means is received, said cam follower means being driven in accordance with the depth of said slot.

14. A thermostatic control device comprising a temperature sensitive blade having first and second ends, said blade having at least one slot extending from said first end toward said second end to form at least two sections, means for mounting said blade adjacent said second end, means for interlocking said sections at selected distances from said second end comprising a band of a substantially rigid construction bridging said sections, said band being shaped at its ends so as to tightly embrace the outer sides of said blade, a signal receiving means engaging one of said sections for receiving a signal therefrom in accordance with the temperature sensed thereby, a lever secured to said blade and cam means for biasing said lever and in turn said blade to establish an equilibrium temperature by said signal receiving means.

15. A temperature sensing device comprising at least one temperature sensitive bi-metallic blade having first and second ends, said blade having at least one slot extending from said first end toward said second end to form at least two sections, means for interlocking said sections at selected distances from said first end.

References Cited by the Examiner

UNITED STATES PATENTS 1,243,647   10/17   Whittelsey _____ 73—363.1

ISAAC LISANN, *Primary Examiner.*